June 9, 1959 — E. WINER — 2,889,577
SPOOLING

Original Filed May 26, 1950 — 9 Sheets-Sheet 1

Fig. 1.

Inventor
Ephraim Winer

By Karl W. Flocks
Attorney

June 9, 1959

E. WINER 2,889,577

SPOOLING

Original Filed May 26, 1950

June 9, 1959 E. WINER 2,889,577
SPOOLING
Original Filed May 26, 1950 9 Sheets-Sheet 7

Fig.6.

INVENTOR.
Ephraim Winer
BY
Flocks and Simon
ATTORNEYS

June 9, 1959

E. WINER 2,889,577

SPOOLING

Original Filed May 26, 1950

INVENTOR.
Ephraim Winer
BY
Flocks and Simon
ATTORNEYS

United States Patent Office 2,889,577
Patented June 9, 1959

2,889,577

SPOOLING

Ephraim Winer, Baltimore, Md., assignor to The National Plastics Products Company, Odenton, Md., a corporation of Maryland Continuation of application Serial No. 164,421, May 26, 1950. This application June 27, 1956, Serial No. 594,131

4 Claims. (Cl. 18—8)

This invention relates to the extrusion of monofilaments and to the packaging of extruded monofilaments, and more particularly relates to the manufacture of thermoplastic monofilaments by the hot melt process, wherein thermoplastic in powder or pellet form is fed to the conventional hopper on the conventional steam jacketed barrel of a thermoplastic extruder within which is located an extrusion screw which serves to feed a melting plastic through the barrel and through a die to a take-off mechanism. More particularly, this invention also relates to the packaging of monofilaments so manufactured by the conventional thermoplastic extrusion machine.

This application is a continuation of co-pending application Serial No. 164,421, filed May 26, 1950, which in turn is a continuation-in-part of application Serial No. 597,451, filed June 4, 1945, which is now abandoned.

In conventional thermoplastic extruders, the plastic powder or pellets are fed to the hopper on the extrusion barrel wherein the powder particles or pellets are mechanically fed or fall by gravity to the rearward flights of the conventional extruder screw. This conventional extruder screw is adapted to continuously rotate and feed the plastic powder particles or pellets forwardly and in a direction toward the die of the extruder. During passage of the powder particles or pellets through the extrusion cylinder within which the extrusion screw rotates, the powder or pellets are subjected not only to the pressure created by the screw, but also to heat, which serves to melt the powder particles or pellets, and it is because of this thermal step in the process that this type of extrusion process is known as the hot melt extrusion process. The utilization of the conventional extruder screw within the barrel of the conventional extruder makes it possible for the extrusion process to be carried on continuously twenty-four hours a day and seven days a week.

The desirability of carrying on the hot melt extrusion process continuously will readily be apparent and understood when it is appreciated that the hot melt plastic extrusion process is a truly continuous process as distinguished from a batch operation or a batch extrusion process.

In a batch extrusion process, a predetermined slug or charge is placed within the barrel of the extruder and is then forced outwardly through the die under the influence of a piston-like plunger which is driven through the extruder barrel. After one batch of material is extruded, the piston is pulled backwardly through the cylinder bore and another charge of raw material is placed within the extruder cylinder and the plunger is again reciprocated toward the die. This type of plunger extrusion is truly a batch process such as is used in connection with the extrusion of metal wire and other metal extrusions such as aluminum moldings, for example.

It will be understood that there is very little similarity between the batch extrusion process and the continuous hot melt extrusion process used for the production of plastic monofilaments. It will also be understood that the take-off problems associated with the handling of filaments extruded by a continuous hot melt plastic extruder are entirely and critically different and more complex than those associated with the handling of material from a batch extruder.

The material emanating from a batch extruder is of finite length. Monofilaments emanating from a hot melt screw-type extruder are truly of indefinite length and their length will correspond to the length of time that the plastic screw type hot melt extruder is operated. As the plastic hot melt screw-type extruder operates twenty-four hours a day for seven days a week and may operate three-hundred and sixty-five days in a year, it will readily be appreciated that plastic monofilaments may be of truly indefinite length and the handling of such a monofilament after it leaves the extruder is quite a different problem from the handling of a wire which emanates from a die behind which is a definite charge of billeted metal being acted upon by a plunger.

Plastic monofilaments are conventionally manufactured by the hot melt extrusion process involving the extruding of a plurality of monofilaments in truly continuous fashion through a die to a take-off mechanism. It has been conventional in the past to connect preliminary winding apparatus to this take-off mechanism to produce a hank or coil of relatively small depth which hank or coil is then disassociated from the preliminary winding apparatus and later associated with a secondary winding apparatus or spooling machine in a manner such that the spooling machine receives the individual filaments from a free pay-off device. By the utilization of the invention, the preliminary winding apparatus is eliminated and the spooling machine receives individual monofilaments continuously and in an uninterrupted manner from a conventional hot melt screw-type extruding machine. The wound spools thus produced in accordance with applicant's invention, while they are directly associated with filaments coming from the hot melt screw-type extruder, have coils thereon of great depth and are satisfactory for use without further processing in weaving, braiding, rope making and other processes where such spools are required. The extruding machine is shown in the drawings schematically and is of the type well known to those skilled in the art of plastic screw extrusion. It is significant that the arrangement and association of the instant take-off, including the spooling mechanism, with the instant hot melt extruder, is critically different from that which has been known heretofore and the direct packaging of monofilaments emanating from a hot melt screw-type extruder producing a large number of monofilaments simultaneously of indefinite length, is a considerable advance in the art.

Examples of the type of hot melt thermoplastic filaments which may be produced by the utilization of the instant invention include such plastic monofilaments as copolymers of vinyl and vinylidene chloride, polyethylene, vinyl compounds, and the like.

When a spool, upon which filament is to be wound, is rotated on a shaft revolving at a constant speed, that is, revolving at a constant number of revolutions per minute, the velocity of the filament being wound upon the spool will gradually increase as the filament is built up on the spool. That is, as the filament is built up, the diameter of the filament on the barrel of the spool increases so that the circumference increases and as the number of r.p.m. of the barrel is constant, the velocity in feet per minute of the filament being wound gradually increases. If a mechanism were arranged involving a spool adapted to be rotated at a constant number of r.p.m. and the filament to be wound on the spool came from a feeder which fed the filament at a constant velocity in feet per minute, then as the filament built up in diameter on the barrel of the spool, the tension in the filament would increase and in a practical installation the breaking point of the filament would be reached before the spool was completely wound if the spool had a barrel of relatively small diameter and the flanges of the spool were of relatively large diameter so that if the spool were completely wound, the ratio of the outside diameter of the wound filament would be relatively large with respect to the diameter of the barrel.

Spools adapted to be rotated at 1500 r.p.m. having a barrel diameter of approximately 2" or less and adapted to have wound thereon a coil of filament having an outside diameter of approximately 4" or more of filament having a tensile strength of 50,000 lbs. per square inch or less could not be wound full at said constant 1500 r.p.m. without effecting the breaking of the filament before the spool is completely wound.

It has not been found feasible prior to the instant invention to connect a hot melt continuous thermoplastic extruder directly to a multi-spindle spooler because of the problems involved in handling a multiplicity of spools while a multiplicity of filaments are being produced in continuous fashion of greater length than the capacity of the individual spools. While multi-spindle spoolers such as that shown in the patents to McKinney #1,360,554, Starring et al. #2,184,704, Chaffin #1,100,355, and Johnson et al. #2,237,560 were known, it was not feasible to directly associate these spoolers with continuous hot melt screw-type extruders producing large numbers of monofilaments of individual lengths as it was not considered possible nor feasible nor practical to produce packages of monofilaments on these prior machines. Prior to the instant invention, it was believed that if such an attempt were made, the filaments as they were produced could not be associated with winding spindles by an operator and that the result would be that the monofilaments would fall upon the floor as they were produced instead of winding upon the individual spools in the manner required by industry. While the Johnson et al. patent does show the direct association of two winding spindles with a batch-type extruder, it is quite obvious that the spools are directly related in size to the length of filament being produced in a single operation and that the machine is at rest while spools are being changed and further that there is no provision in the Johnson et al. patent for the handling of filaments of indefinite length produced continuously. In the Johnson et al. patent, as in the patent to Starring et al., the winding spindles are fed from above, making it difficult to handle a large number of filaments. The winding apparatus in the patent to Chaffin is obviously to batch winder as it is practically impossible to have access to the spindles during their winding operation and the same is true with respect to the McKinney apparatus.

Prior to the instant invention, there has been disclosed creeling apparatus, such as that shown in the patent to Cocker #2,102,680, but the creeling apparatus is not analogous to the combination of a truly continuous extruder and continuous packaging apparatus. In all creeling apparatus, the operation performed is truly an unwinding process as distinguished from a winding process. In the unwinding process associated with a creel, the yarn being unwound is of finite length as measured by the length of yarn on the individual spools on the spindles of the creeling apparatus. Fundamentally, the unwinding process associated with creeling apparatus is one that can be stopped and started at will as the unwinding associated with creeling apparatus is a preliminary step to the manufacture of the warp to be associated with a loom for weaving. Accordingly, it will be understood that the disclosure in the Cocker patent #2,102,680 is not analogous to the instant invention and there is truly no suggestion of what is herein disclosed in the Cocker Patent #2,102,680.

Prior to the instant invention, it has been conventional in the textile industry to first wind the filament, as it is produced, on a relatively large collapsible reel or other device from which a coil or hank can be readily removed which relatively large reel may have a barrel of approximately 36" in diameter and relatively small flanges of approximately 37" in diameter or no flanges at all as this type of reel which produces the hank is not adapted to develop a coil of any great depth in order that the tension in the filament not be increased beyond the breaking point as the large reel is rotated at a constant number of r.p.m. After the preliminary winding is effected on the relatively large diameter reel, the hank may be slipped off the collapsible reel and arranged on a free pay-off device which feeds the spool freely so that no unduly large tension will be produced in the filament as the spool is rotated at a constant number of r.p.m. As the diameter of the coil on the spool builds up, the velocity of the filament being wound thereon increases correspondingly and, accordingly, the speed of the filament from the free pay-off device also increases. Instead of slipping the hank from the relatively large reel, the relatively large reel itself may be mounted for free rotation on a fixed shaft so that a free pay-off may be effected to the spool which rotates at constant r.p.m.

It is an object of the instant invention to teach a novel manner of producing packaged monofilaments from thermoplastic pellets or powder in a continuous fashion.

It is another object of the instant invention to teach a novel association of winding spindles with a hot melt screw-type extruder producing monofilaments continuously of indefinite length and at a constant velocity in feet per minute.

It is still another object of the invention to teach a novel association of winding spindles with a continuous hot melt screw-type extruder.

It is a further object of the invention to provide a mechanism for producing and individually packaging a large number of individual monofilaments of indefinite length produced at a constant velocity in feet per minute.

It is still a further object to provide a novel mechanism whereby a plurality of monofilaments of indefinite length continuously produced may be individually spooled in a relatively small space and a single operator may service all of the spools.

Other objects and the nature and advantages of the instant invention will be apparent from the following description taken in conjunction with the accompanying drawings, wherein.

Figure 1:
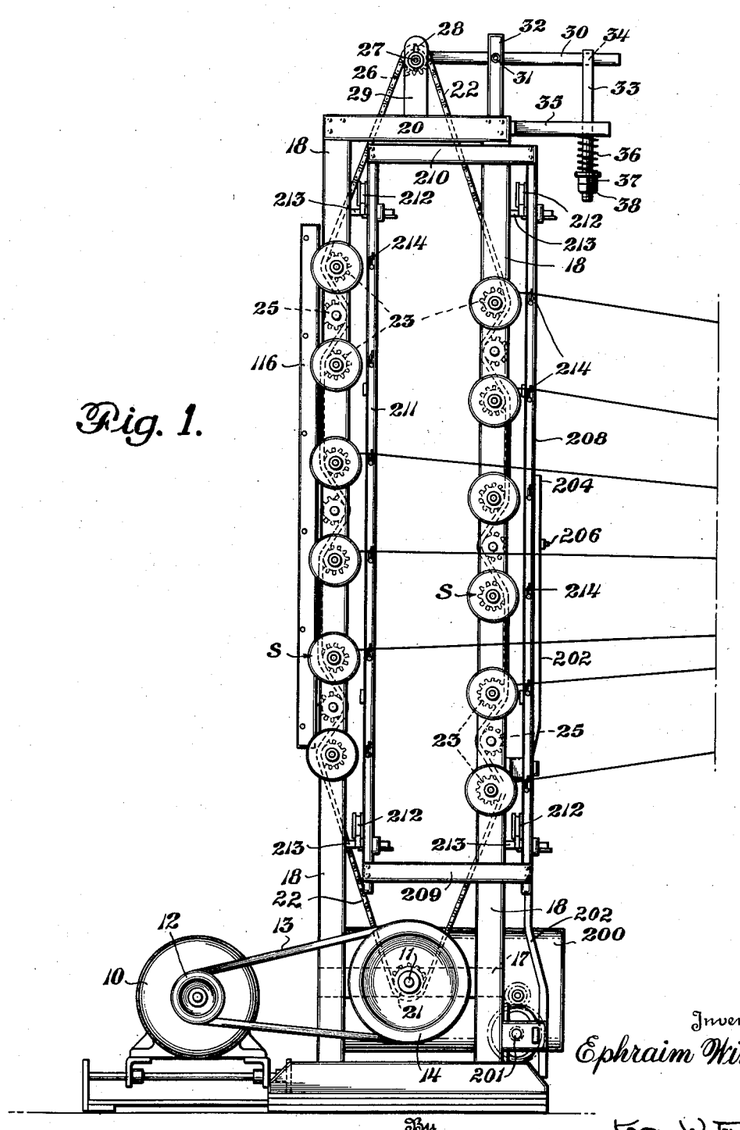
Fig. 1 is a side view in elevation of one form of spooling machine in accordance with the invention.

Referring to the drawings, the electric motor 10 drives the main drive shaft 11 through the driving pulley 12, belt 13 and driven pulley 14. The main drive shaft 11 is mounted for rotation about a horizontal axis and is journalled at 15 and 16 (see Fig. 2) in the cross members 17 which are secured to the four vertical frame members 18. In addition to the four frame members 18, the frame also comprises two vertical center spindle bearing support members 19 (see Fig. 2). The four frame members 18 and the two center bearing support members 19 are secured together at their respective top portions by horizontal frame members 20 to make up a sturdy box-like frame.

Mounted on the main drive shaft 11 are a pair of sprocket wheels 21 which serve to drive each of the two sprocket chains 22, which in turn drive the sprocket wheels 23 associated with the spindle assemblies 24. Between each alternate pair of sprocket wheels 23 associated with any one vertical frame member 18 is an idler sprocket wheel 25 which also cooperates with the sprocket chain 22 as shown in Fig. 1.

At the top of the machine is mounted a pair of tension adjustment sprocket wheels 26 capable of free rotation about horizontal axes which are adjustable in a vertical plane. The shaft 27 on which the sprocket wheels 26 are fixed ride in the slots 28 formed in each of the vertical supports 29 which are fastened to the horizontal frame members 20. A lever 30, pivotally mounted at 31 to the vertical supports 32 which in turn are secured to the horizontal frame members 20, has a bifurcated end comprising two arms which straddle the shaft 27 so that oscillation of the lever 30 about the pivot 31 will cause movement of the shaft 27 upwardly and downwardly in a vertical plane. Engaging the lever 30 at the opposite end is the rod 33 having a slot 34 at its upper end through which the lever 30 passes. The rod 33 passes through the horizontal support 35 which is secured at one end to the frame member 20. The compression spring 36 is mounted about the rod 33 and bears against the lower side of the horizontal support 35 at its upper end and against an adjusting nut 37 at its lower end. A lock nut 38 may also be provided for locking the position of the adjusting nut 37 in the desired location so that the proper tension is maintained in the sprocket chain 22 during the operation of the spooling machine despite temperature and humidity changes in the room in which the spooling machine is operated.

Figure 2:
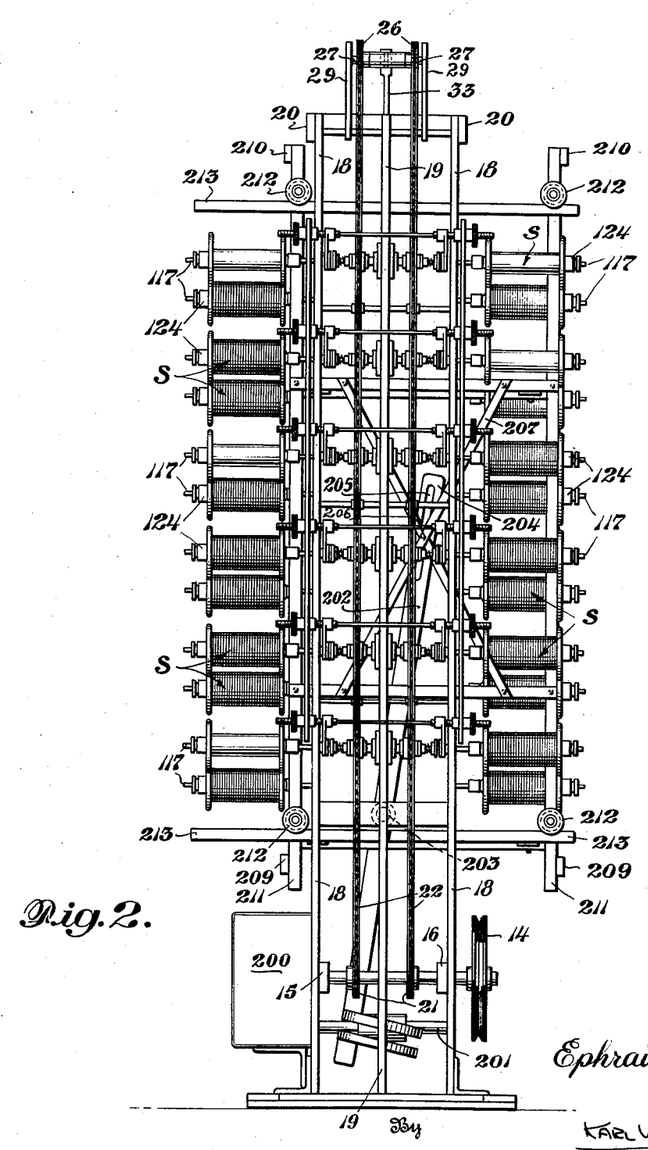
Fig. 2 is a rear view in elevation of the spooler shown in Fig. 1.
Figures 2A, 2B:
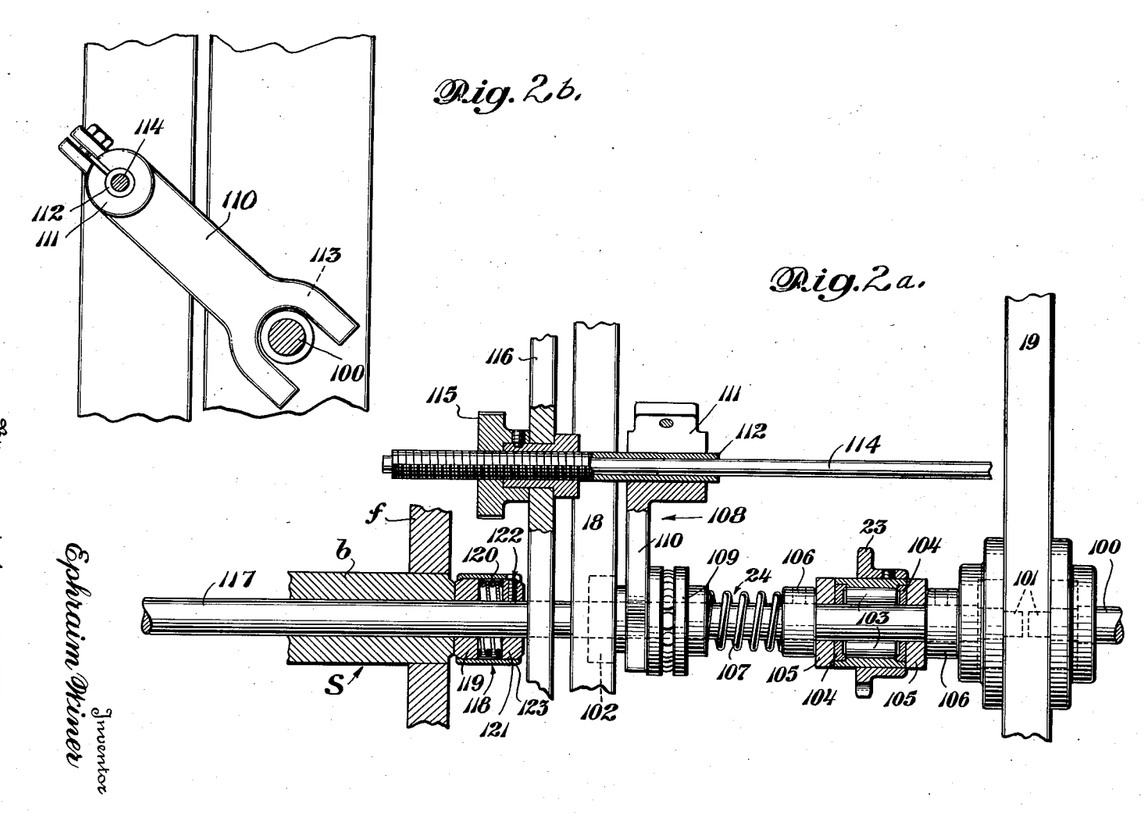
Fig. 2a is a view in elevation of the spindle assembly of the apparatus shown in Figs. 1 and 2 with parts broken away and parts shown in section.
Fig. 2b is a detailed view in side elevation of an element of the adjustment mechanism for the spindle assembly of Fig. 2a with parts broken away and parts in section.

Referring to Figs. 2a and 2b, the spindle assemblies 24 each comprise a spindle shaft 100 which is journalled at 101 in bearing relation in the center spindle bearing support member 19 and at 102 in bearing relation in the vertical frame member 18. The sprocket wheels 23 are mounted for rotation on needle bearings 103 which are supported by the spindle shafts 100 in such a manner that the sprocket wheels 23 can rotate freely about the shafts 100. The hub sides 104 of the sprocket wheels 23 are adapted to be frictionally engaged by the two friction washer members 105 which are mounted concentrically on each of the shafts 100. The opposite sides of the friction washer members 105 are adapted to frictionally engage the two clutch members 106 which are keyed to each of the spindle shafts 100 in order that each of the sprocket wheels 23 may drive each of the spindle shafts 100 through the engagement of the clutch assemblies which include the hub sides 104, both sides of each of the friction washers 105 and the inner sides of the clutch members 106.

Forcing the clutch members 106 into engagement with the washer members 105 which are in turn adapted to be forced against the sides of the hub 104 of the sprocket wheel 23 is the compression spring 107 which is mounted coaxially about the spindle shaft 100.

The compression spring 107 is maintained under compression by the actuating assembly 108 comprising a pushing collar 109 mounted in bearing relation with the spindle shaft 100, the bifurcated arm 110 which has its bifurcated end 113 straddling the shaft 100 and engaging the outer side of the pushing collar 109 and its opposite end 111 fixed to the threaded sleeve 112 which is adapted to be moved in an axial direction over the fixed rod 114 by rotation of the adjustment nut 115 which is internally threaded to cooperate with the threads on the sleeve 112 and is mounted for rotation in the auxiliary frame member 116. By rotating the nut 115, the threaded sleeve 112 is caused to move axially over the fixed rod 114 carrying with it the arm 110 which has one end secured to the threaded sleeve 112 and 111 and the other bifurcated end 113 straddling the spindle shaft 100 and engaging one side of the pushing collar 109 so that the compression force in the compression spring 107 is either increased or relieved depending upon which direction of rotation the nut 115 is caused to move. This manual adjustment affects the operation of the clutch assembly associated with the sprocket wheel 23 and the spindle shaft 100.

This manual adjustment of the clutch operation can be utilized to keep the tension in the filaments being wound at a fixed value, particularly in view of the fact that as the temperature and humidity change in the room within which the machine is operated, the tension in the filaments being wound changes correspondingly.

In utilizing a spool having a barrel of hard maple of approximately 2" in diameter and having a bore of approximately ⅝" diameter while winding a filament within the range of .010" and .020" in diameter having a tensile strength of 25,000 to 50,000 lbs. per square inch, a 65-gram pull in the filament produces a satisfactory wind, whereas with a 110-gram pull in the filament the barrel of the spool would be crushed. Generally, in winding filaments of lesser size, a lower pull in the filament produces a satisfactory wind and in winding filaments of larger diameter a greater pull is needed. The tension in the filament can be accurately measured with a tensiometer while the machine is running and adjustments can be made by turning the adjusting nut 115 to either compress or relieve the compression spring 107, which through the clutch mechanism described will effect the speed of rotation of the spindle shaft 100 which in turn affects the tension in the filament being wound.

Under fixed psychrometric conditions; that is, under fixed temperature and humidity values, the clutch mechanism for controlling the drive between the sprocket wheel 23 and the spindle shaft 100 may be adjusted for effecting varying speeds of rotation in r.p.m. corresponding to the diameter of the coil of filament being wound; that is, when the coil is approximately 2" in diameter the spindle shaft may be rotated at approximately 1300 r.p.m. and when the diameter of the coil is about 4" in diameter the spindle shaft speed may have dropped to approximately 550 r.p.m. in order to maintain a substantially constant speed of wind, that is to say the winding of a substantially constant amount of feet per minute. In other words, under fixed psychrometric conditions and with a given setting of the nut 115, each spool mounted upon each spindle shaft 100 will be rotated at decreasingly less speed so as to effect the winding of a constant amount of feet of filament per minute and tension within the filament will be maintained which will be neither unduly high nor unduly low but will be within predetermined limits so as to produce a satisfactory wind or coil.

Should the temperature or humidity or both change so that the tension within the filament changes, which tension can be measured with a tensiometer while the machine is running, a manual adjustment may be made by the opeartor so as to bring the tension within the filament back to within the predetermined required range by simply turning the nut 115 while the machine is in operation.

The spool S comprising a barrel b and flanges f are adapted to be slipped over the outer ends 117 of the spindle shafts 100 and moved into engagement with the resilient stop 118. Spring clips 124 cooperating with depressions in the spindle shafts near the outer ends thereof serve to hold the individual spools S in place on the shafts 100. In order to mount the spool, the operator merely slips the spool over the spindle shaft until contact is made with the stop member 118 and then the spring clips 124 are slipped over the outer end of the spindle shafts to lock the spools in place. To remove a spool it is simply necessary to pull the spring clip 124 from the end of the spindle shaft 100 and slip the spool off the spindle shaft.

In order that the winding of the filament on the spool may be generally in the form of a helix, the spool will be rotated about a fixed axis in a fixed position on the spindle shaft, a transverse mechanism has been incorporated into the machine which causes the filament to move from side to side across the spool as it is fed to the spool. This traverse mechanism comprises a gear reducing system located in the box 200 which is driven from the main shaft 11. The gear reducing system drives the shaft 201 at relatively slow speed.

Located on the shaft 201 is a cam having a surface thereon of such configuration as to cause oscillation from side to side at a fixed point of a follower which picks up this oscillating motion and transfers it to the drive bar 202 which drive bar is pivoted on the frame at 203. The upper end 204 of the drive bar 202 is slotted at 205 to receive a rider 206 which picks up the oscillating motion from the drive bar 202. The rider 206 is secured to the X-frame 207 which in turn is secured to the front rectangular traverse frame 208 which in turn is secured by lower horizontal members 209 and upper horizontal members 210 to the rear traverse rectangular frame 211. Mounted on both the front traverse frame 208 and the rear traverse frame 211 are the eight guide wheels 212 which ride on trackways 213. Secured to the outer sides of the front traverse frame 208 and rear traverse frame 211 are the formed wire guide lops 214 through which the filament passes on its way to the spools.

Accordingly, it will be understood that as the spools rotate the filament is wound onto the spool and as the traverse frames oscillate from side to side the winding takes place in the form of a helix.

In Figs. 1 and 2, the machine illustrated is approximately 7' in height so that a single operator can conveniently service the 24 spools mounted thereon, 12 of which are toward the front of the machine and 12 of which are toward the rear of the machine. The 12 spools mounted toward the front of the machine occur six on each side, are substantially equally spaced from one another in a vertical direction, and are somewhat lower than the corresponding spools mounted toward the rear of the machine. This staggered relationship of the front and rear spools facilitates the feeding of the filament to the rear spools without interfering with the front spols.

While all of the spools can be operated simultaneously, in practice a few of the spools are maintained on the machine as spares so that when a spool becomes completely wound the filament being fed toward it can rapidly be switched to a fresh spool and the fully wound spool removed and replaced by a fresh spool. In this manner uninterrupted continuous operation can be effected. In the event of the breaking of a filament for any reason the broken filament can be started on a mounted spare spool and the partially wound spool and a fresh spool substituted therefor without discontinuing the operation of the machine.

Individual adjustments can be made in the operation of any spindle without effecting the operation of the entire machine by the manual operation of the nut 115 so as to affect the operation of the clutch mechanism associated with the spindle assembly 24. While adjustment of the slack in the sprocket chains 22 is effected automatically by the springs 36, manual adjustment thereof may be made to change the tension in the sprocket chains 22 by the operation of the adjustment nuts 37.

Figure 3:
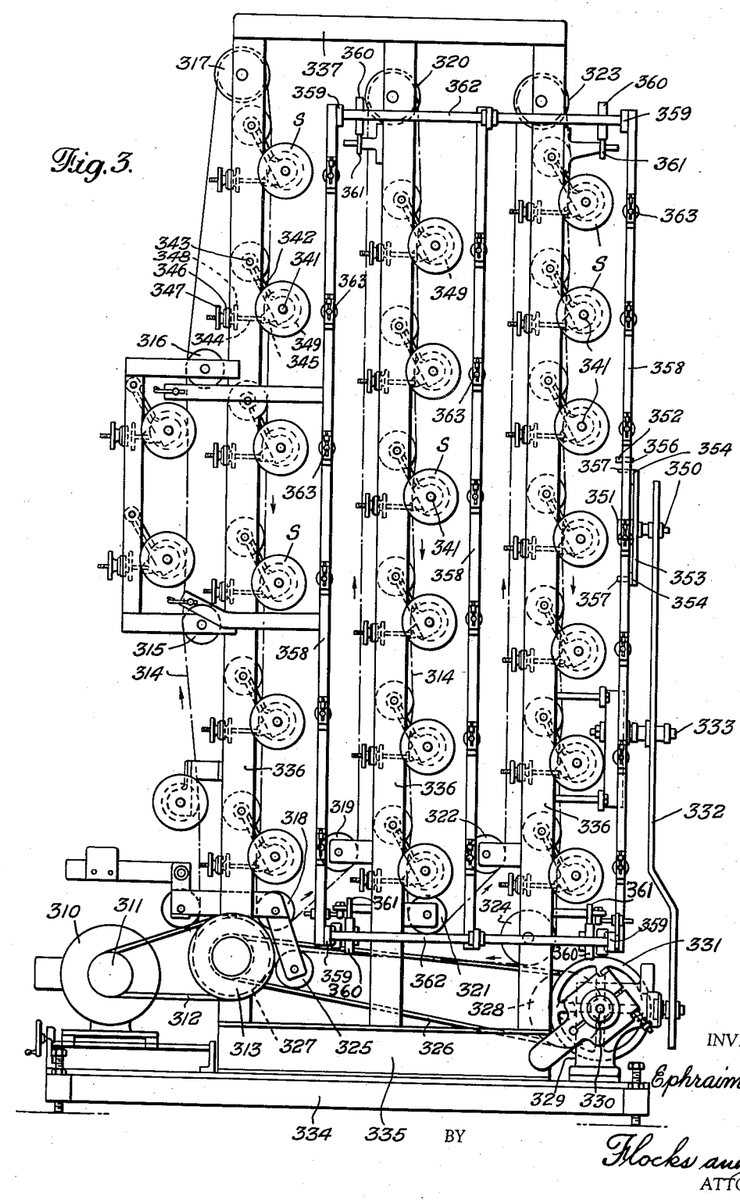
Fig. 3 is a side view in elevation of a second spooling machine in accordance with the invention.
Figure 4:
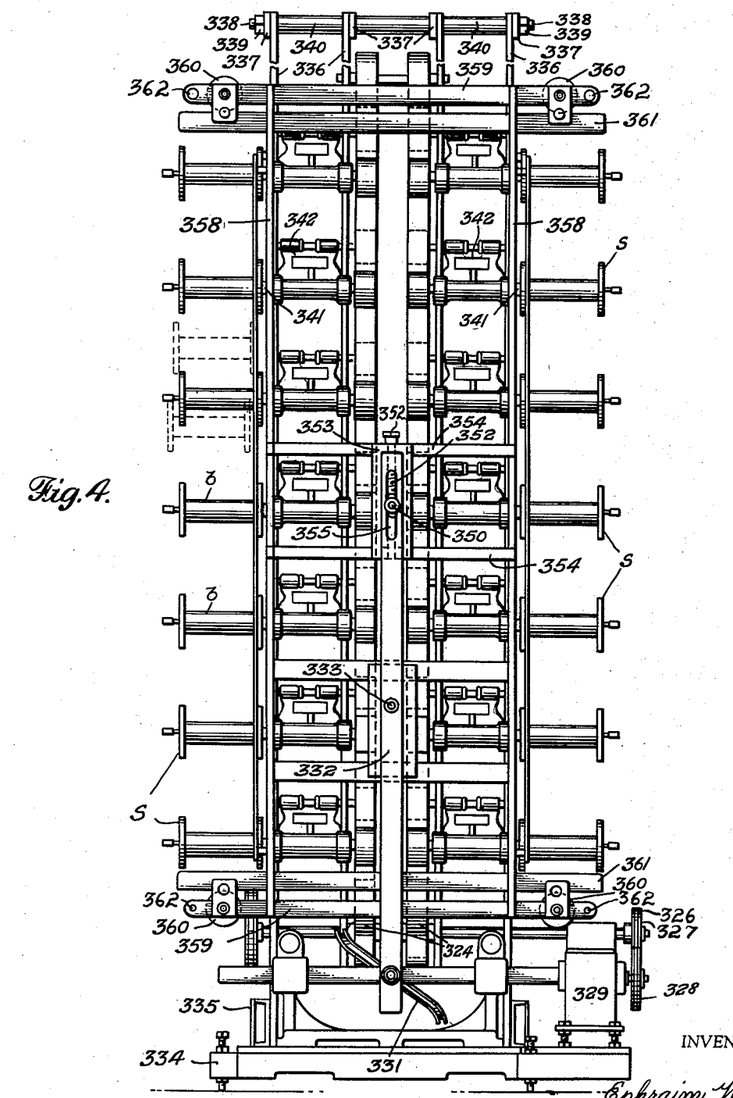
Fig. 4 is a front view in elevation of the spooler shown in Fig. 3.

Referring to Figs. 3 and 4, the electric motor 310 drives the main drive pulley 311, which through the medium of the endless belt 312 drives the main belt pulleys 313. The two endless main belts 314 pass upwardly from the pulleys 313 over the idler pulleys 315, over the idler pulleys 316, and over and around the top pulleys 317 and then down under the fixed rotatable pulleys 318, then upwardly and around the pulleys 319 and then upwardly over and around the pulleys 320 and then down and under the fixed rotatable pulleys 321 and then upwardly and around the fixed rotatable pulleys 322 and then upwardly around the fixed rotatable pulleys 322 and then upwardly over and around the top pulleys 323 and then down under and around the fixed rotatable pulleys 324, then over and around the movable rotatable pulleys 325 and then back and around the main belt pulleys 313.

The endless belt 326 cooperates with the pulleys 327 which rotates with the pulleys 313 and the driven pulley 328 which, through the gear reducer 329, drives the shaft 330 on which the cam 331 is fixed and which serves to actuate in an oscillating manner the traverse lever 332 which is pivoted at 333.

The entire spooling machine shown in Figs. 3 and 4 comprises a base 334 which supports the motor 310, the gear reducer 329 and the sub-base 335 which supports the vertical frame members 336. The six vertical members 336 are tied together at their tops by the horizontal cross members 337. The horizontal cross bars 337 are held in spaced relation by the bolt 338, nuts 339 and the spacing sleeves 340. The spindle shafts 341 are mounted for rotation in the hangers 342 which are pivotally supported at 343 by the vertical frame members 336. The adjusting screws 344 are pivotally secured to the ears 345 which are integral with the hangers 342 and pass through horizontal supports 346 which are fixed to the vertical members 336. Two adjusting nuts 347 and 348 cooperate with the screw 344 and the horizontal members 346 to fix the position of the hanger 342 with respect to belts 314. The driven pulleys 349 fixed to the spindles 341 cooperate with the belts 314 and are driven thereby with the amount of slippage governed by their position which is adjusted by the screw 344.

As the spools S are filled with filament or yarn from the source which feeds filament to the spooling machine at a constant velocity in feet per minute and as the diameter of the filament or yarn on the spools increases, the tension in the filament or yarn is maintained constant because the amount of slippage between the pulleys 349 and the belts 314 increases, thereby slowing down the r.p.m. of the pulleys 349 and the spools S. In order that the slippage be controlled as to maintain the constant tension in the filament or yarn as it is wound, the adjusting mechanisms already described are provided.

The traverse mechanism receives its oscillating motion from the traverse lever 332 through the pin 350 which is fixed to the nut 351 which cooperates with the adjusting screw 352 which can be moved up and down with respect to the slotted plate 353. The plate 353 is secured to the horizontal cross members 354 which are part of the traverse frame. The motion is transmitted by the pin 350 by its bearing against the slot 355 in the upper end of the lever 332 and the slot in the plate 353. The position of the pin 350 may be adjusted by the screw 352 which engages the journals 357 and causes the nut 351 to move upwardly or downwardly as the screw 352 is rotated.

The traverse frame comprises the vertical bars 358 which are secured to the horizontal bars 359 to which are secured the rollers 360 which ride on the tracks 361 secured to the vertical frame members 336. The traverse frame members 358 are secured at their tops and bottoms respectively by the horizontal members 362.

Accordingly, it will be understood that the motor 310 drives each of the spools S through the spindles 341 which receive their motion from the belts 314 and the traverse frame which receives its motion from the gear reducer 329, shaft 330, the cam 331, the lever 332 and the pin 350.

The filament or yarn from the single producing source feeds at a constant velocity in feet per minute to the thread guides 363, which guide the filament or yarn to the spools S which wind the filament or yarn under constant tension and the traverse mechanism serves to move the filament or yarn horizontally in one direction until the end of the spool is reached and then in the opposite direction to apply successive layers of filament or yarn to the barrel $b$ of the spools so that the filament or yarn builds up on the spools in an increasing diameter and while the diameter on the barrel of the spools increases in diameter the same tension in the filament or yarn is maintained because of the slippage of the pulleys 349 with respect to the driving belts 314.

Referring specifically to Fig. 3, the operator faces this elevation of the spooling machine and services all the spools which are within arm's reach and the arrangement of the thread guides and traverse mechanism and spindle locations are such that all the filaments which are received from the producing source can be separated and handled individually by each spool. Any one of the spools may be completed, that is completely wound, before any of the other spools and, in fact, all the spools may be operated at a different stage of completion without interfering with each other or with the mechanism. Completed spools are removed from the machine individually and fresh spools are placed on empty spindles, started with filament or yarn and the winding process is again initiated, all as already described.

The spooling machine shown in Figs. 3 and 4 is designated as a 38-spindle spooler and can be readily manipulated in practice by a single operator with ease.

The spooling machine shown in Figs. 3 and 4 receives the filament or yarn from that side of the machine on which the traverse lever 332 is located and referring specifically to Figs. 3 and 4, the first plane of spindles is set up to handle fourteen spools, the second plane of spindles, which is directly behind the first plane, is set up to handle twelve spindles, and the third plane, which is the rearmost plane, is set up to handle twelve spools. The spindles in the second plane extend outwardly a little more on each side than the spindles of the first plane and the spindles in the third plane extend outwardly a little more than the spindles in the second plane so that viewing the machine from the top or in a plan view the spooling machine would be slightly wedge-shaped. This arrangement serves to facilitate the handling of the filaments or yarn.

Figure 5:
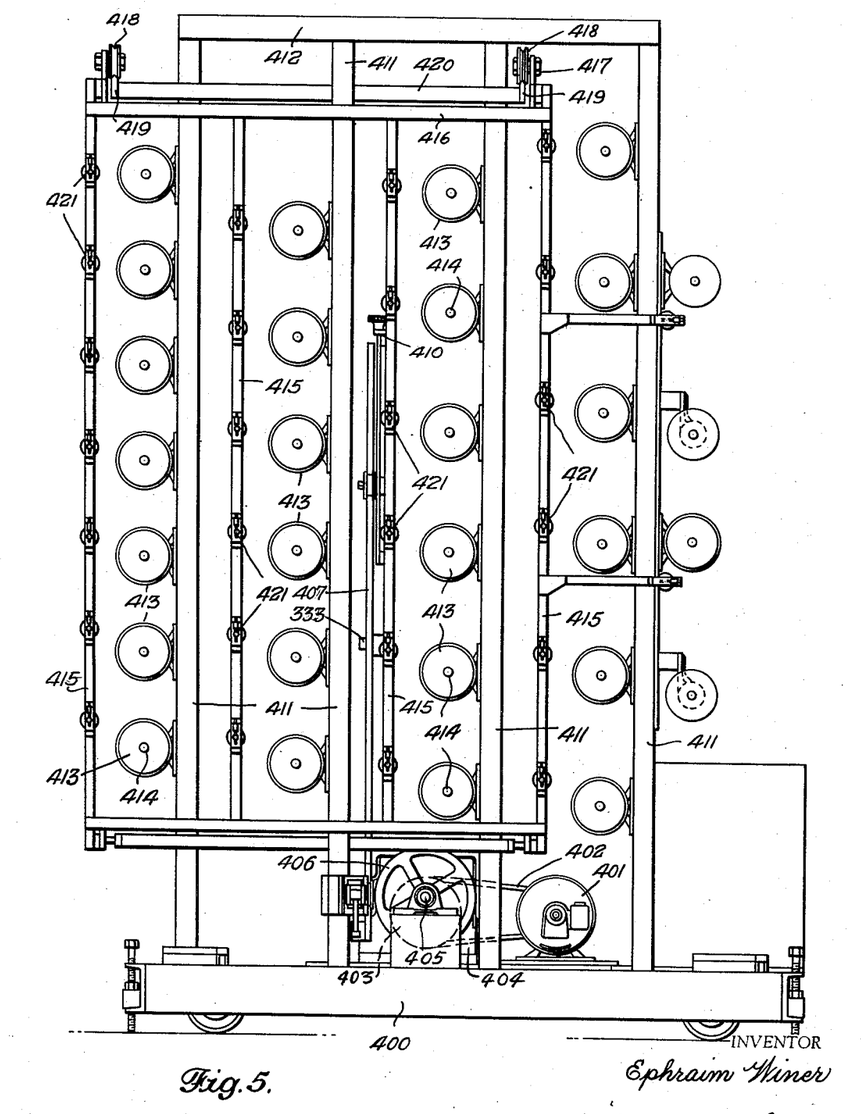
Fig. 5 is a side view in elevation of a third spooling machine in accordance with the invention.
Figure 6:
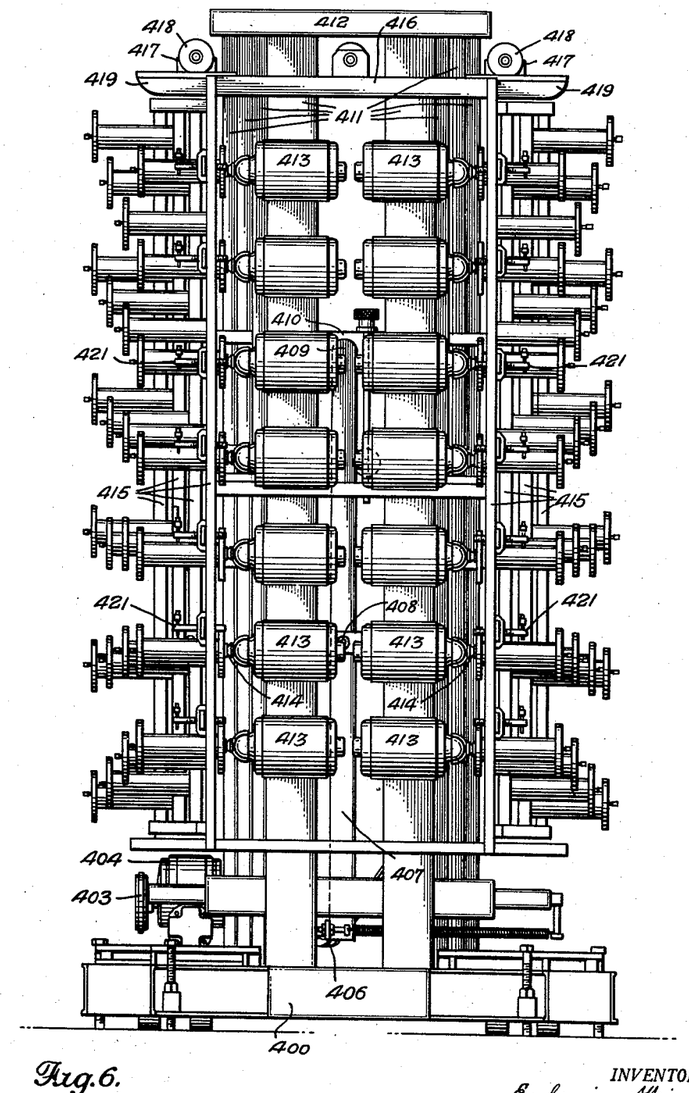
Fig. 6 is a front view in elevation of the spooling machine shown in Fig. 5.
Figure 7:
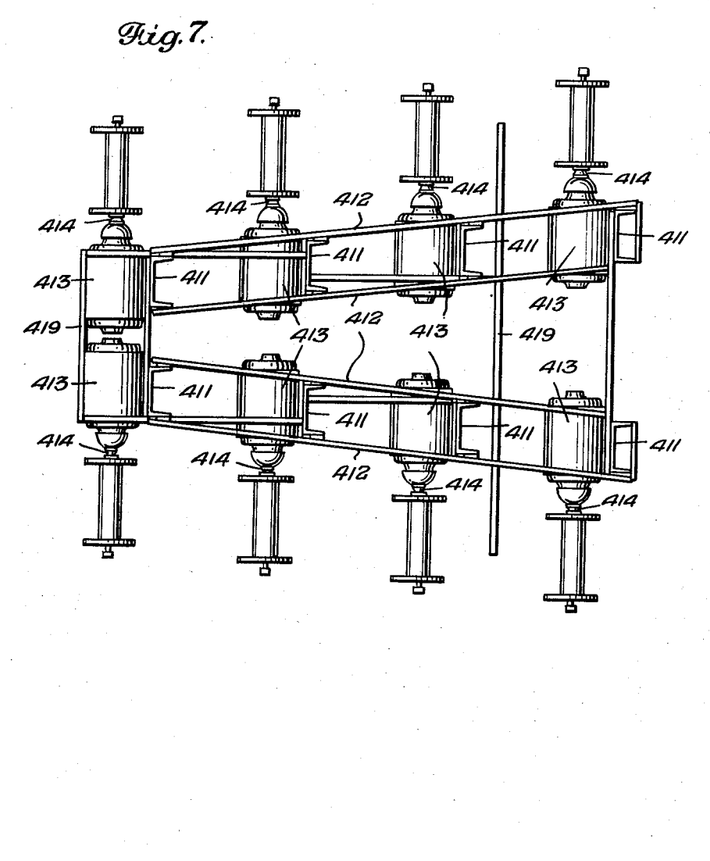
Fig. 7 is a partial plan or top view of the spooling machine shown in Fig. 5.

Referring to Figs. 5, 6 and 7, the spooling machine comprises a base 400 on which is mounted the motor 401 which, through the belt 402, drives the pulley 403 which drives the gear reducer in the box 404 which in turn drives the shaft 405 on which is mounted the traverse cam 406. The traverse cam 406 imparts an oscillating motion to the lower end of the traverse lever 407 which oscillates about the pivot point 408 and through its upper end 409 is connected in oscillating relation with the horizontal members 410 of the traverse frame.

Mounted on the base 400 are the eight vertical supporting members 411 which are secured at their respective tops by the horizontal cross members 412. Secured on the left or front side of the vertical members 411 (see Fig. 5) are the electric motors 413 which drive the spindles 414 in such a manner that a constant tension is set up in the filament or yarn being wound as the filament or yarn is fed to the spindles at a constant velocity in feet per minute.

The traverse frame is set up in four planes and comprises the vertical members 415 tied together by the horizontal top members 416 to which are secured the bearings 417 for the wheels 418 which ride the tracks 419 secured to the horizontal members 420 which in turn are secured to the vertical supporting members 411.

As the lever 407 is oscillated by the cam 406, oscillating motion is imparted to the four planes of the traverse frame. The top of the lever 407 is adjustably secured to the traverse frame so that the traverse action can be controlled. Mounted on each of the planes of the traverse frame are the thread guides 421, each in cooperating location with respect to each of the spindles 414.

Each of the vertical planes of spindle locations are so arranged that the top or plan view is in the general configuration of a wedge, as shown specifically in Fig. 7. In the first plane, the plane closest to the filament or yarn producing source, the spindles on one side are closest to the spindles on the opposite side. In the second plane, the plane behind the first plane, the spindles on one side are a little farther apart with respect to the spindles on the other side. In the third plane, the plane behind the second plane, the spindles are a little farther apart from the spindles on the opposite side, as compared with the spindles in the second plane. In the fourth plane, the plane behind the third plane, the spindles on one side are a little farther apart from the spindles on the opposite side as compared with the spindles in the third plane.

The characteristics of the electric motors 413 are such that a constant tension will be maintained in the filament or yarn being wound upon the spindles and as the diameter on the barrel of the spools increases, the r.p.m. of the spindles will be decreased. Any one of the spools may be at a different stage of completion than any other of the spools. One spool may be in the stage nearing completion whereas another spool may just be started.

Looking at the spooling machine from the elevation shown in Fig. 5, a single operator may service all the spools, each of which are within easy and handy reach of the operator. In the first plane, which is closest to the source of filament or yarn, there are fourteen spindles; in the second plane there are twelve spindles; in the third plane there are twelve spindles and in the fourth plane, there are twelve spindles. This machine is designated as a 50-spindle spooler.

Figure 8:
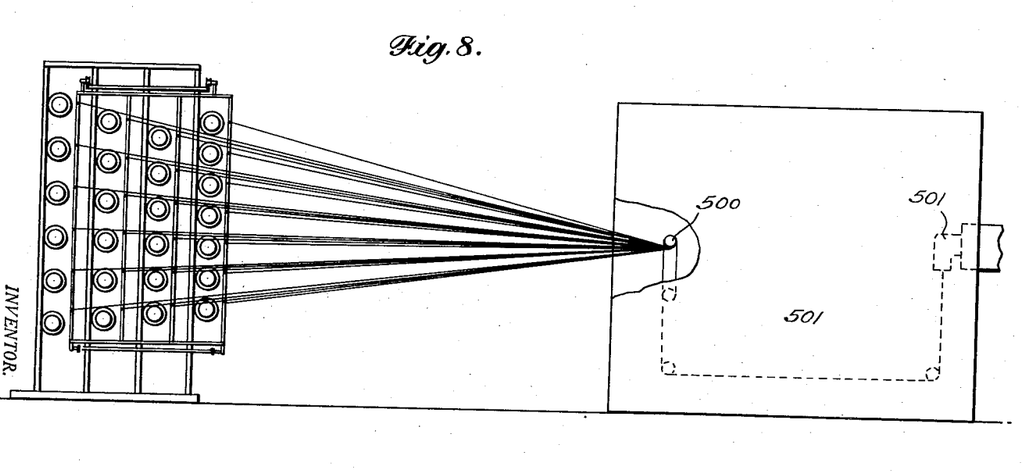
Fig. 8 is a schematic side view of the machine shown in Fig. 5 and showing schematically part of the filament producing source.
Figure 9:
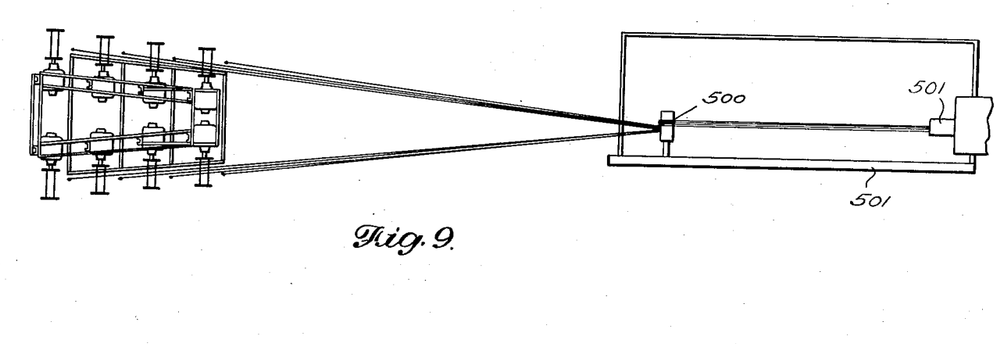
Fig. 9 is a schematic plan or top view of the arrangement shown in Fig. 8.

Referring to Figs. 8 and 9, the single source of filament or yarn is shown at 500, the filament or yarn producing equipment is schematically shown at 501. At 500 each of the filaments are separated in a cone-like manner and taken over an individual thread guide and then wound upon an individual spool. All the spools on one side of the spooling machine, as shown in Fig. 8, are within easy and handy reach of a single operator. All of the filaments are readily separated. The traverse mechanism though operated as an integral unit, handles the threads in planes, one behind the other. Each spindle is so arranged in the spooling machine that it may have its own speed in r.p.m. whereby a constant tension may be maintained. On each side of the machine the spindles are located so as to have a horizontal axis, multiple spindles are arranged one above the other in vertical planes which are located one behind the other. The vertical planes located one behind the other are all arranged within arm's length of the operator. When more than two planes of spindles are utilized, each plane behind the front plane may be wider. The spools in any one plane are staggered with respect to the spindles of adjacent planes.

Accordingly, it will be understood that the machine may be operated continuously despite varying psychrometric conditions which may effect the tension in the filament without necessitating any shutdown of the machine, that individual spools may be changed without necessitating any shutdown and that in general all practical adjustments may be made to the machine while it is in operation so that continued operation of the spooling machine may take place twenty-four hours a day and correspond to the operation of the machine feeding the filament at substantially constant velocity to the spooling machine.

A substantial saving is effected by winding the filament or yarn as it is produced directly upon the spools to produce packages which may be shipped to weavers without any intermediate handling steps. In order to accomplish this purpose it is necessary to coordinate the spooling machine with the filament or yarn producing equipment. If the filament or yarn producing equipment is small and is capable of producing only a single filament or two filaments, then the structure of the spooling machine is correspondingly simple. When, however, it is economically and practically feasible to produce a large filament producing machine which is capable of producing as many as 24 to 50 filaments, it would ordinarily be impractical to spool the filaments directly as the servicing of a large number of spools or spindles receiving filament from a single source would require that the operator be moving over a large area and perhaps too large an area to handle these number of filaments. It is necessary in servicing the spooler not only that the operator be able to reach all the spindles, but the operator must pick up each individual filament from the source and initiate its winding operation on the spool. Accordingly, it will be understood that the organization of the individual spools and their relation to the single source is significant and that the arrangement with the spools with respect to the source is critical. It is particularly significant that the spoolers in accordance with the instant invention are designed to handle filament produced at a single source at a constant velocity and at several hundred feet per minute.

It will be obvious to those skilled in the art that various changes may be made without departing from the spirit of the invention and therefore the invention is not limited to what is shown in the drawings and described in the specification but only as indicated in the appended claims.

What is claimed is:

1. In an apparatus for continuously producing a plurality of hot melt thermoplastic filaments in a single hot melt screw-type thermoplastic extruder and continuously and directly winding on separate and individual packages each of said filaments so produced, a single hot melt screw-type thermoplastic extruder, a single multi-orifice die associated with said extruder, said single extruder producing a plurality of hot melt thermoplastic monofilaments continuously of indefinite length at a constant velocity in feet per minute, means for winding each of said plurality of filaments into individual packages successively during the continuous production of said filament at said constant velocity in feet per minute without stopping the operation of the extruder, said winding means comprising a frame supporting a plurality of spindles in a first series of vertical planes one behind the other, means for effecting the rotation of said spindles at independent and varying angular velocities at a rate generally in inverse proportion of the diameter of wound filament on individual packages on said spindles, each of said planes passing through spindles located one above the other and one at the side of another with those that are located one at the side of the other having their spool receiving ends pointing away from each other in generally opposite directions, said filament producing means being located within the area bounded by the horizontal projections of said uppermost and lowermost spindles and said spindles in each of more than one vertical plane being arranged to receive said filaments from said single filament producing means directly and entirely within said projected area and said filament producing means being arranged to transmit said filaments entirely within said projected area, said filaments passing to any of said spindles in any of said vertical planes which are behind any of other of said vertical planes, moving between live operating spindles in a vertical plane immediately in front thereof, each of said spindles having a horizontal axis arranged substantially at right angles to said filaments as they are produced, all of said spindles on each side of said winding means having their spool receiving ends located in another vertical plane and within an arm's span of an operator, traverse means located between each of said vertical planes of said first series and arranged for oscillation horizontally, said traverse means cooperating with each of said spindles.

2. In combination, a single hot melt screw-type thermoplastic extruder, a single multi-orifice die associated with said extruder, said single extruder producing a plurality of hot melt thermoplastic monofilaments continuously of indefinite length at a constant velocity in feet per minute, means for winding each of said plurality of filaments into individual packages successively during the continuous production of said filaments at said constant velocity in feet per minute, said winding means comprising a frame supporting a plurality of spindles in a first series of vertical planes one behind the other, means for effecting the rotation of said spindles at independent and varying angular velocities at a rate generally in inverse proportion to the diameter of wound filament on individual packages on said spindles, each of said planes passing through spindles located one above the other, said filament producing means being located within the area bounded by the horizontal projections of said uppermost and lowermost spindles and said spindles in each of more than one vertical plane being arranged to receive said filaments from said single filament producing means directly and entirely within said projected area and said filament producing means being arranged to transmit said filaments entirely within said projected area, said filaments passing to any of said spindles in any of said vertical planes which are behind any of other of said vertical planes, moving between live operating spindles in a vertical plane immediately in front thereof, each of said spindles on one side of said winding means having a horizontal axis arranged substantially at right angles to said filaments as they are produced and with their spool receiving ends located in another vertical plane and within an arm's span of an operator, traverse means located between each of said vertical planes of said first series and arranged for oscillation horizontally, said traverse means cooperating with each of said spindles.

3. The structure recited in claim 1, said winding means comprising at least fifty spindles.

4. The structure recited in claim 1, wherein the distance between the spindles which lie one at the side of another in the first series of vertical planes progressively increases as the vertical planes are further away from the extruder.

References Cited in the file of this patent

UNITED STATES PATENTS

| | | |
|---|---|---|
| 1,100,355 | Chaffin | June 16, 1914 |
| 1,360,554 | McKinney | Nov. 30, 1920 |
| 1,968,359 | Sippel | July 31, 1934 |
| 2,102,680 | Cocker | Dec. 21, 1937 |
| 2,184,704 | Starring et al. | Dec. 26, 1939 |
| 2,237,560 | Johnson et al. | Apr. 8, 1941 |
| 2,295,942 | Fields | Sept. 15, 1942 |
| 2,324,397 | Hull | July 13, 1943 |
| 2,581,922 | Spencer | Jan. 8, 1952 |